United States Patent
O'Donnell et al.

(10) Patent No.: US 7,877,130 B2
(45) Date of Patent: Jan. 25, 2011

(54) SYSTEM AND METHOD FOR USING DELAYED ENHANCEMENT MAGNETIC RESONANCE IMAGING AND ARTIFICIAL INTELLIGENCE TO IDENTIFY NON-VIABLE MYOCARDIAL TISSUE

(75) Inventors: Thomas O'Donnell, New York, NY (US); Ning Xu, Champaign, IL (US); Randolph M. Setser, Shaker Heights, OH (US); Richard D. White, Chagrin Falls, OH (US)

(73) Assignee: Siemens Medical Solutions USA, Inc., Malvern, PA (US)

( * ) Notice: Subject to any disclaimer, the term of this patent is extended or adjusted under 35 U.S.C. 154(b) by 1667 days.

(21) Appl. No.: 10/677,190

(22) Filed: Oct. 2, 2003

(65) Prior Publication Data
US 2004/0132006 A1    Jul. 8, 2004

Related U.S. Application Data

(60) Provisional application No. 60/415,840, filed on Oct. 3, 2002.

(51) Int. Cl.
*A61B 5/05* (2006.01)
(52) U.S. Cl. ................................ 600/410; 600/407
(58) Field of Classification Search ......... 600/407–480; 382/128, 129, 130, 131, 132, 133, 168, 171, 382/181, 216, 201, 202, 203, 219, 232, 256, 382/274, 276, 277, 282, 286–294; 378/50, 378/20, 21, 23
See application file for complete search history.

(56) References Cited

U.S. PATENT DOCUMENTS

2003/0187362 A1* 10/2003 Murphy et al. ............... 600/508
2004/0064064 A1* 4/2004 Zhou et al. .................. 600/558

OTHER PUBLICATIONS

"Relationship of MRI Delayed Contrast Enhancement to Irreversible Injury, Infarct Age and Contractile Function", Kim et al., Circulation, Nov. 1999, pp. 1992-2002.

"Multislice First Pass MR Perfusion Imaging in Comparison to Regional Myocardial Wall Thickening Analysis", Wintersperger et al., Proceedings of the Int'l Society for Magnetic Resonance in Medicine, 6th Scientific Meeting and Exhibition, ISMRM 98, Sydney, Apr. 18-24, 1998, vol. 2, p. 891.

"Dobutamine Magnetic Resonance Imaging Predicts Contractile Recovery of Chronically Dysfunctional Myocardium After Successful Revascularization", Baer et al., JACC, vol. 31, No. 5, Apr. 1998, pp. 1040-1048.

"Semi-Automatic Segmentation of Non-Viable Cardiac Tissue Using Cine and Delayed Enhancement Magnetic Resonance Images", O'Donnell et al., Medical Imaging 2003: Physiology and Function: Methods, Systems and Applications, Proc. of the SPIE, vol. 5031, Feb. 16-18, 2003, pp. 242-251.

(Continued)

*Primary Examiner*—Brian Casler

(57) ABSTRACT

A system and method for imaging and identifying non-viable myocardial tissue in a patient's myocardium is disclosed. Images of a section of the myocardium are obtained. An endocardial border and epicardial border of the section of the myocardium is segmented. The section of the myocardium is divided into sectors. One or more selected features of the sectors of the myocardial wall are measured and applied to a decision surface. A determination is made as to whether each sector contains viable or non-viable myocardial tissue. An image that shows each sector of the myocardial wall and an indication of its viability is displayed.

12 Claims, 5 Drawing Sheets

OTHER PUBLICATIONS

"Visualisation of presence, location and transmural extent of healed Q-wave and non-Q-wave myocardial infarction", Wu et al., Lancet, vol. 357, No. 9249, Jan. 6, 2001, pp. 21-28.

"Relation Between Gd-DTPA Contrast Enhancement and Regional Inotropic Response in the Periphery and Center of Myocardial Infarction", Gerber et al., Circulation, Aug. 28, 2001, pp. 998-1004.

"Pattern Classification—Second Edition", Duda et al., 2001, John Wiley & Sons, Inc., New York, Chapters 5.1, 5.2, 5.11.

Kim et al. "Relationship of MRI Delayed Contrast Enhancement to Irreversible Injury, Infarct Age, and Contractile Function", Circulation, Nov. 9, 1999, pp. 1992-2002.

Gerber et al., "Relation Between Gd-DTPA Contrast Enhancement and Regional Inotropic Response in the Periphery and Center of Myocardial Infarction", Circulation, Aug. 28, 2001, pp. 998-1004.

Choi et al., "Transmural Extent of Acute Myocardial Infarction Predicts Long-Term Improvement in Contractile Function", Circulation, Sep. 4, 2001, pp. 1101-1107.

Kim et al., "The Use of Contrast-Enhanced Magnetic Resonance Imaging to Identify Reversible Myocardial Dysfunction", The New England Journal of Medicine, Nov. 16, 2000, vol. 343, No. 20, pp. 1445-1453.

Bonneville et al., "Support vector machines for improving the classification of brain PET images", SPIE Conf. on Image Processing, San Diego, CA, Feb. 1998, SPIE vol. 3338, pp. 264-273.

Gokturk et al., "A Statistical 3-D Pattern Processing Method for Computer-Aided Detection of Polyps in CT Colonography", IEEE Trans. on Medical Imaging, vol. 20, No. 12, Dec. 2001, pp. 1251-1260.

El-Naqa et al., "A Support Vector Machine Approach for Detection of Microcalcifications in Mammograms", 2002 IEEE, pp. II-953-II956.

Fieno et al., "Contrast-Enhanced Magnetic Resonance Imaging of Myocardium at Risk", Journal of the Amer. College of Cardiology, vol. 36, No. 6, 2000, pp. 1985-1991.

Simonetti et al., "An Improved MR Imaging Technique for the Visualization of Myocardial Infarction", Radiology, Jan. 2001, vol. 218, No. 1, pp. 215-223.

Rehwald et al., "Myocardial Magnetic Resonance Imaging Contrast Agent Concentrations After Reversible and Irreversible Ischemic Injury", Circulation, Jan. 15, 2002, pp. 224-229.

Baer et al., "Dobutamine Magnetic Resonance Imaging Predicts Contractile Recovery of Chronically Dysfunctional Myocardium After Successful Revascularization", JACC, vol. 31, No. 5, Apr. 1998, pp. 1040-1048.

* cited by examiner

SYSTEM AND METHOD FOR USING DELAYED ENHANCEMENT MAGNETIC RESONANCE IMAGING AND ARTIFICIAL INTELLIGENCE TO IDENTIFY NON-VIABLE MYOCARDIAL TISSUE

CROSS REFERENCE TO RELATED APPLICATION

This application claims the benefit of U.S. Provisional Application Ser. No. 60/415,840, filed on Oct. 3, 2002, which is incorporated by reference in its entirety.

FIELD OF THE INVENTION

The present invention is directed to a system and method for segmenting myocardial tissue using medical images (e.g., Delayed Enhancement MR, Cine MR), and more particularly, to a system and method for using support vector machines to intelligently identify non-viable myocardial tissue using one or more features that are characteristic of that tissue type.

BACKGROUND OF THE INVENTION

In the aftermath of a heart attack, the identification and assessment of non-viable (necrotic) tissues is necessary for effective development of intervention strategies and treatment plans for certain types of heart disease. Those tissues which are healthy or capable of recovery through coronary bypass, stent placement, etc., should be distinguished from those which are non-viable, or irreversibly damaged. In this way, predictions may be made as to which patients might benefit from revascularization so as to increase their cardiac function and survival rate.

Physicians rely on several non-invasive indicators for determining viability of myocardial tissue. The morphology of the myocardium, specifically its thinning, is evidence of necrotic tissue. In addition, abnormal motion, such as passive movement of a region or in extreme cases no movement at all can indicate myocardial damage. However, although morphology and functional changes are indicative of tissue abnormality, they are not sufficiently sensitive to differentiate abnormal from non-viable (dead) tissue.

Contrast enhanced imaging techniques may also be used to help identify non-viable regions. Positron-emission tomography (PET) and single-photon-emission tomography SPECT are capable of indicating viability information through differential signal intensity. However, these modalities are of limited utility as their resolution is quite low and are not generally available in the case of PET.

Recently a new contrast enhanced imaging technique, Delayed Enhancement Magnetic Resonance (DEMR) has been shown to enable direct visualization of non-viable myocardium. DEMR imaging is a technique whereby non-viable myocardial tissue appears with increased signal intensity. DEMR is typically performed using a standard inversion recovery MRI acquisition sequence 20-30 minutes after administration of paramagnetic contrast agent (e.g., Gd-DTPA). Furthermore, DEMR has sufficient spatial resolution to accurately distinguish viable (normal or ischemic) from non-viable myocardium within the left ventricular wall. Radiologists typically acquire these images in conjunction with other functional modalities (e.g., MR Cine), and use domain knowledge and experience to isolate the non-viable tissues.

Even with the information provided above, determination of tissue viability can be challenging. First, DEMR is prone to false negatives. That is, a region which is non-viable may not have increased signal intensity. Second, assigning viability status based on morphology and differential morphology (thickening or wall motion) requires a certain amount of experience and intuition. And, the indicators describing abnormal wall motion may be conflated. In other words, is a particular region of the heart moving independently or is it being pulled along by a neighboring region? In short, it may take an expert to label a region as non-viable.

Despite the difficulty in its identification, there remains a great deal of interest in locating and quantifying non-viable tissues because it has been shown that the extent of infarction is closely related to long-term improvement in cardiac function after coronary revascularization. However, DEMR is a recent technique not yet approved by the FDA and a clinician new to DEMR will not be as experienced as experts that have had a hand in testing and developing it. Ideally, the clinician, novice or not, would be provided with feedback from an expert.

There has been a great deal of work on DEMR, but there have been few schemes described for automatically segmenting it. In one known technique, a region of viable myocardium in a DEMR image is manually isolated, its average intensity found, and pixels with intensities two standard deviations above are labeled as non-viable. Previous MRI techniques have either used cardiac morphology and function alone to determine tissue viability, or have examined the relationship between the amount of non-viable tissue and resulting cardiac function.

As mentioned above, DEMR is prone to false negatives. And, traditional techniques for segmentation such as region growing or thresholding of DEMR yield inadequate results.

SUMMARY OF THE INVENTION

The present invention is directed to employing a machine learning technique, such as Support Vector Machines (SVM), to arrive at a segmentation strategy by incorporating multiple indicators in order to identify non-viable myocardial tissue. The present invention segments non-viable myocardial regions automatically using DEMR, morphological and differential morphological information. Artificial intelligence techniques are used to "learn" how an expert would perform the segmentation. Thereby the clinician in the field is provided with a second opinion of the form, "Our expert would rate the following regions as non-viable with a such-and-such percent confidence." Ultimately it is the clinician's responsibility to categorize tissues as viable or non-viable. However, this type of feedback can be valuable input and assist the clinician in making an appropriate medical diagnosis. In the worst case, it speeds the clinical throughput by providing a good, editable guess at a solution.

BRIEF DESCRIPTION OF THE DRAWINGS

Preferred embodiments of the present invention will be described below in more detail, wherein like reference numerals indicate like elements, with reference to the accompanying drawings.

DETAILED DESCRIPTION

Figure 1:
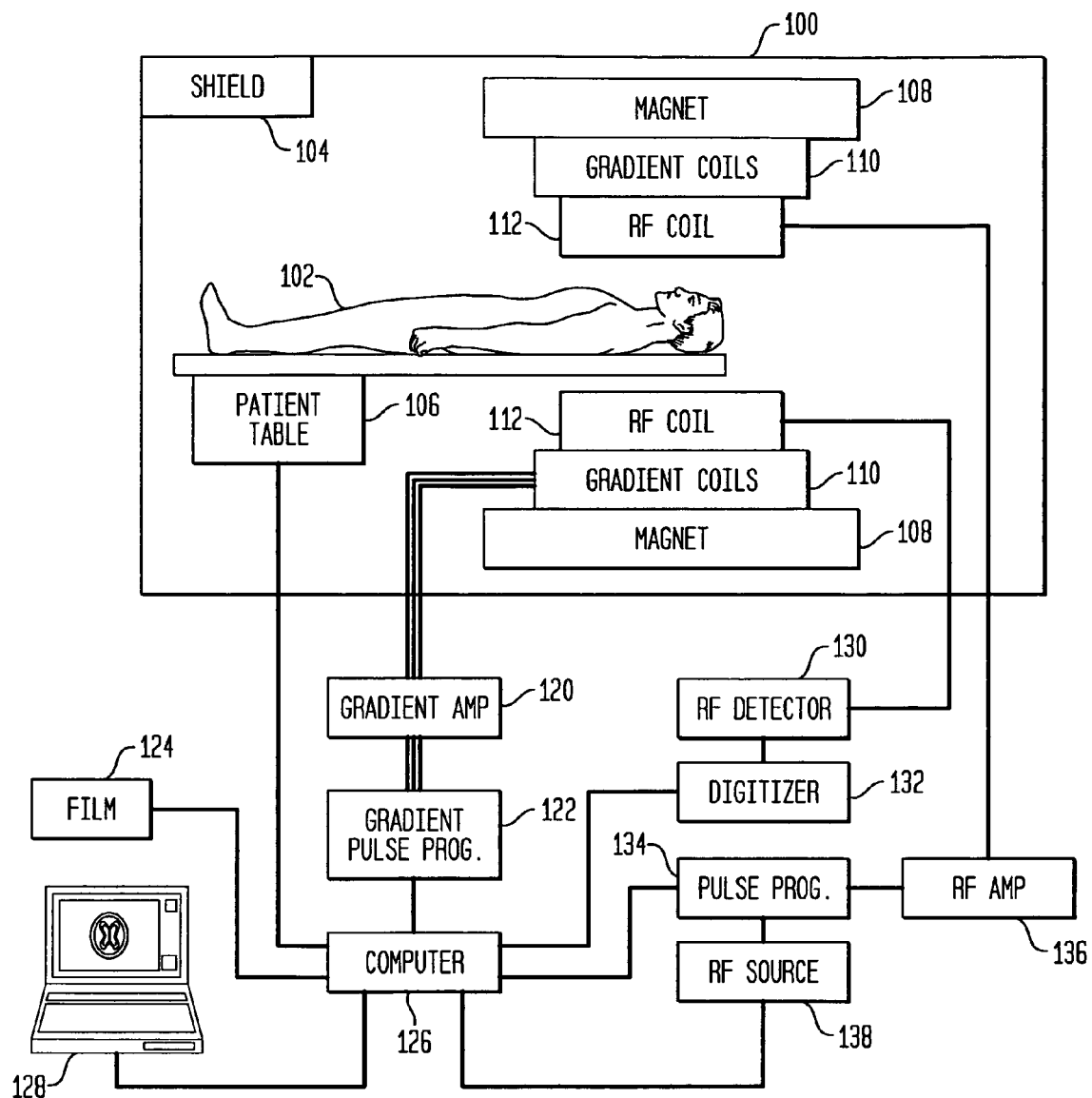
FIG. 1 is a block diagram of a system architecture for an exemplary Magnetic Resonance Imaging (MRI) system in accordance with the present invention.

The present invention is directed to a system and method for using support vector machines to intelligently identify non-viable myocardial tissue using one or more features of myocardium that are characteristic of non-viable tissue. FIG. 1 is a block diagram of an exemplary Magnetic Resonance Imaging (MRI) system in accordance with the present invention. An example MRI system is a MAGNETOM class MRI system manufactured by Siemens AG.

FIG. 1 illustrates a schematic representation of components of the MRI system located in a scan room 100. A magnet 108 produces a first magnetic field for the imaging procedure. Within the magnet 108 are the gradient coils 110 for producing a gradient in the magnetic field in the X, Y, and Z directions. Within the gradient coils 110 is the Radio Frequency (RF) coil 112. The RF coil 112 produces a second magnetic field necessary to rotate the spins by 90° or 180°. The RF coil 112 also detects the signal from the spins within the body. A patient 102 is positioned within the magnet 108 by a computer controlled patient table 106. The table 106 has a positioning accuracy of 1 mm. The scan room 100 is surrounded by an RF shield 104. The shield 104 prevents the high power RF pulses from radiating out through the hospital. It also prevents the various RF signals from television and radio stations from being detected by the MRI system. Some scan rooms are also surrounded by a magnetic shield which contains the magnetic field from extending too far into the hospital. In newer magnets, the magnet shield is an integral part of the magnet.

A central element of the MRI system is the computer 126. The computer 126 controls all components on the MRI system. The RF components under control of the computer 126 are the radio frequency source 138 and pulse programmer 134. The radio frequency source 138 produces a sine wave of the desired frequency. The pulse programmer 134 shapes the RF pulses into apodized sinc pulses. An RF amplifier 136 increases the pulses power from milli Watts to kilo Watts. The computer 126 also controls the gradient pulse programmer 122 which sets the shape and amplitude of each of the three gradient fields. The gradient amplifier 120 increases the power of the gradient pulses to a level sufficient to drive the gradient coils 110.

An array processor (not shown), included in some MRI systems, is a device which is capable of performing a two-dimensional Fourier transform in fractions of a second. The computer 126 off loads the Fourier transform to this faster device. An operator of the MRI system gives input to the computer 126 through a control console 128. An imaging sequence is selected and customized from the console 128. The operator can see the images on a video display located on the console 128 or can make hard copies of the images on a film printer (not shown).

Delayed Enhancement Magnetic Resonance (DEMR) has been shown to enable direct visualization of non-viable myocardium. DEMR imaging is a technique whereby non-viable cardiac tissue appears with increased signal intensity. DEMR is typically performed using a standard inversion recovery MRI acquisition sequence 20-30 minutes after administration of paramagnetic contrast agent (Gd-DTPA). Furthermore, DEMR has sufficient spatial resolution to accurately distinguish viable (normal or ischemic) from non-viable myocardium within the left ventricular wall. Radiologists typically acquire these images in conjunction with other functional modalities (e.g., MR Cine), and use domain knowledge and experience to isolate the non-viable tissues.

It is to be understood by those skilled in the art that other contrast agents can be used in the DEMR procedure. For example, manganese or iron contrast agents can be used as well. Consideration of various contrast agents is described in an article entitled "Tissue-specific MR Contrast Agents" by Weinmann H J., Ebert W., Misselwitz B., and Schmitt-Willich H. in the European Journal of Radiology, Vol. 46, Issue 1, pages 33-44, April 2003 which is incorporated by reference.

Figure 2:
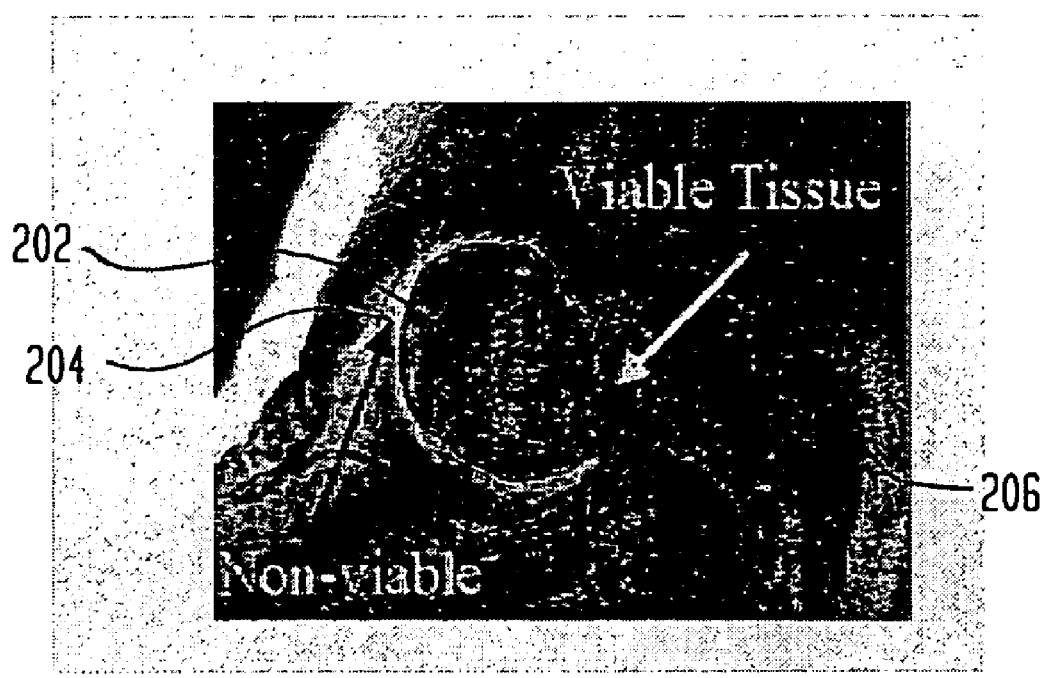
FIG. 2 is an image created using DEMR of a left ventricle of a patient's heart.

FIG. 2 illustrates an image created using DEMR of a left ventricle 202. As can be seen, by administering the paramagnetic contrast agent, different areas of the walls of the left ventricle show up as different intensities. As can be seen, the darker wall tissue 206 indicates that the tissue is viable. The brighter wall tissue 204 indicates a higher likelihood that the tissue is non-viable.

The present invention is further enhanced by using artificial intelligence techniques to "learn" how an expert would perform the segmentation. In particular, the present invention uses Support Vector Machines (SVM) to help a clinician determine whether heart tissue is non-viable tissue. SVMs are a supervised artificial intelligence technique in which a computer is trained to recognize a phenomenon given a series of examples. The training is based on a set of user selected features. This learning is considered "supervised" because the examples are tagged by an expert as belonging or not belonging, in our case, to a particular class.

Thus, rather than specify a list of instructions as to how to recognize something, as a traditional computer program might do, the computer "learns" through a series of examples. SVMs have been applied to medical imaging classification and detection tasks previously. They have been employed in distinguishing the differentiating characteristics of polyps and healthy tissue in CT colonography as well as in the classification of brains in PET images. In addition, micro calcifications in mammograms have been detected using SVMs. To our knowledge, however, this is the first application of SVMs to cardiac segmentation.

The present invention takes a SVM and applies it to a high dimension feature space in order to predict an expert's classification of cardiac tissue as viable or not based on features described in the introduction. Specifically, a binary decision function is used, $$f : X \subseteq \Re^n \to \Re \tag{1}$$

that maps the inputs (the raw information)

$$\vec{x} = (x_1, \ldots, x_n) \tag{2}$$

to the outputs (the categories), where $f(\vec{x}) \geq 0$ indicates the positive category. A learning algorithm selects a decision function from a space of candidate decision functions. The decision function takes the form $$f(\vec{x}) = \sum_{i=1}^{l} \alpha_i y_i k(\phi(\vec{x}_i), \phi(\vec{x})) + b \tag{3}$$

where $\phi(\vec{x})$ is a function of the inputs known as a feature, $y_i \in \{-1, 1\}$ is the classification provided by the expert, l is the number of examples, and $\alpha_i$ and b are the weights to be learned. We use for the kernel function, k, a Gaussian radial basis function of the form:

$$k(\phi(\vec{x}), \phi(\vec{x}')) = e^{-\|\phi(x)-\phi(x')\|^2/2\sigma^2} \quad (4)$$

It may be shown that kernels of this form (following Mercer's conditions) have corresponding optimization problems which are convex, lacking local minima. Thus, in contrast to other pattern recognition systems such as neural networks, SVMs are guaranteed to converge in a bounded number of steps. We employ the Matlab implementation of SVMs.

The following is the logic used to divide the myocardium into multiple segments. The classification into viable and non-viable regions takes place on two layers of radial sectors (inner and outer) of the myocardium. The myocardium is described by the endocardial border endo($\theta$)=($x_{endo}(\theta),y_{endo}(\theta)$) and epicardial border, epi($\theta$)=($x_{epi}(\theta),y_{epi}(\theta)$). A centerline, centerline($\theta$)=($x_{centerline}(\theta),y_{centerline}(\theta)$) lies midway between the two.

The myocardium is broken up into an even number of n sectors, S. There are $$\frac{n}{2}$$

inner sectors, $S_{inner}$, and $$\frac{n}{2}$$

outer sectors $S_{outer}$, $$S=S_{inner}+S_{outer} \quad (5)$$

The inner sectors $$S_{inner} = \sum_{i=0}^{\frac{n}{2}-1} s_{inner_i}$$

are bounded by $$\frac{\pi i}{n} \leq \theta < \frac{\pi(i+1)}{n}$$

and endo($\theta$)$\leq$r($\theta$)<centerline($\theta$) while the outer sectors $$S_{outer} = \sum_{i=0}^{\frac{n}{2}-1} s_{outer_i}$$

are bounded by $$\frac{\pi i}{n} \leq \theta < \frac{\pi(i+1)}{n}$$

and centerline($\theta$)$\leq$r($\theta$)<epi($\theta$).

The challenge of employing SVMs is in the selection of features. By features it is meant those measurements taken which will result in an appropriate medical diagnosis regarding viable or non-viable myocardial tissue. Some features which may be included are the image intensity, wall thickness, evidence of heart wall thickening, homogeneity of image regions, the degree to which the bright regions (scar) extend across the heart wall (transmurality) and the position of the scar. In addition, the rate of contrast uptake, motion information from modalities such as Tagged-MR, or intensity from nuclear studies might be used. It is to be understood by those skilled in the art that the features mentioned are merely exemplary and that other features may be included without departing from the scope and spirit of the present invention. It is also to be understood that a weighting scheme may be employed to distinguish importance of one or more features with respect to other one or more features.

Choosing correct features will allow the decision function to separate the examples; inadequate or redundant features will result in poor partitioning. The features, $\phi(\vec{x})$, are defined on the sectors defined above. Thickness is expressed $$T_{s_{inner}} = \int_{\frac{\pi i}{n}}^{\frac{\pi(i+1)}{n}} (centerline(\theta) - endo(\theta)) d\theta \quad (6)$$

as defined for an inner sector, $s_{inner_i}$. The thickness of the outer sector is defined similarly. Note that since the centerline is equidistant between the myocardial borders for a given radial demarcation, a pair of inner and outer sectors will have equal thickness values. Thickening is defined as the change in thickness of a sector from end-diastole to end-systole.

Mean Intensity of a sector, $M_s$ is defined by $$M_s = \frac{\sum_{p \in s} I_p}{\sum_{p \in s} 1} \quad (7)$$

where $I_p$ denotes the intensity of a pixel p in sector s. Homogeneity, $H_s$, is expressed $$H_s = \frac{\sum_{p \in s} \sigma_I^2(p)}{\sum_{p \in s} 1} \quad (8)$$

where $\sigma_I^2(p)$ represents the variance of the 3×3 neighborhood around p Transmurality, $U_s$, of a sector is also included $$U_s = \int_{\frac{\pi i}{n}}^{\frac{\pi(i+1)}{n}} g(\theta))d\theta \qquad (9)$$

where g(θ) represents the longest continuous chord of highlighted pixels from endocardial border (in the case of an inner sector) to centerline in the direction of θ.

The present invention employs a Sequential Minimal Optimization (SMO) technique to determine the weights, $\alpha_i$,b from Equation (3). SMO works by, at each iteration, limiting the optimization to a subset of just two weights. This approach has advantages in speed (since the optimization problem contains only two points it may be solved analytically) and memory usage (the kernel matrix need not be stored in memory).

To determine a in the kernel as well as C, a compromise between maximizing the margin and minimizing the number of training set errors, the "leave-one-out strategy" is employed.

Figure 3:
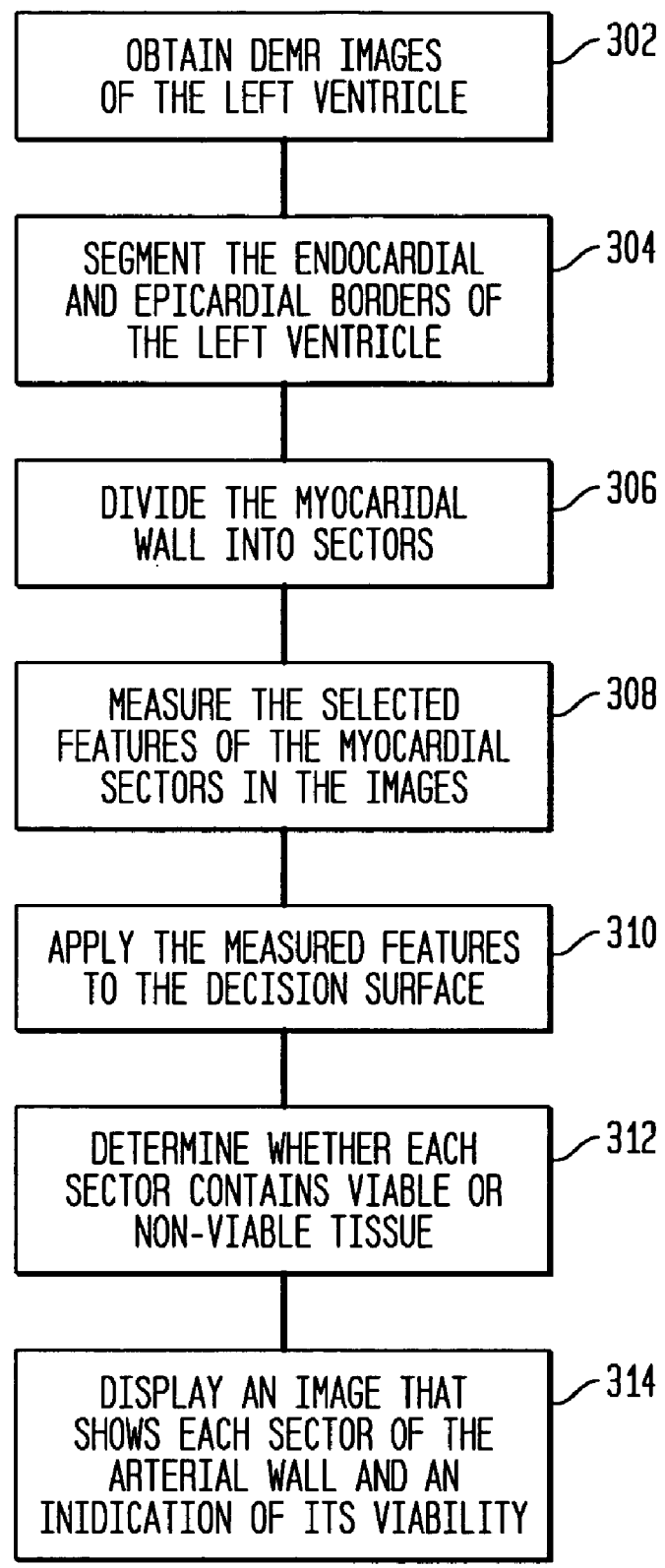
FIG. 3 is a flow chart illustrating a method for using support vector machines to segment myocardial tissue and determine which tissue, if any, is non-viable.
Figure 4:
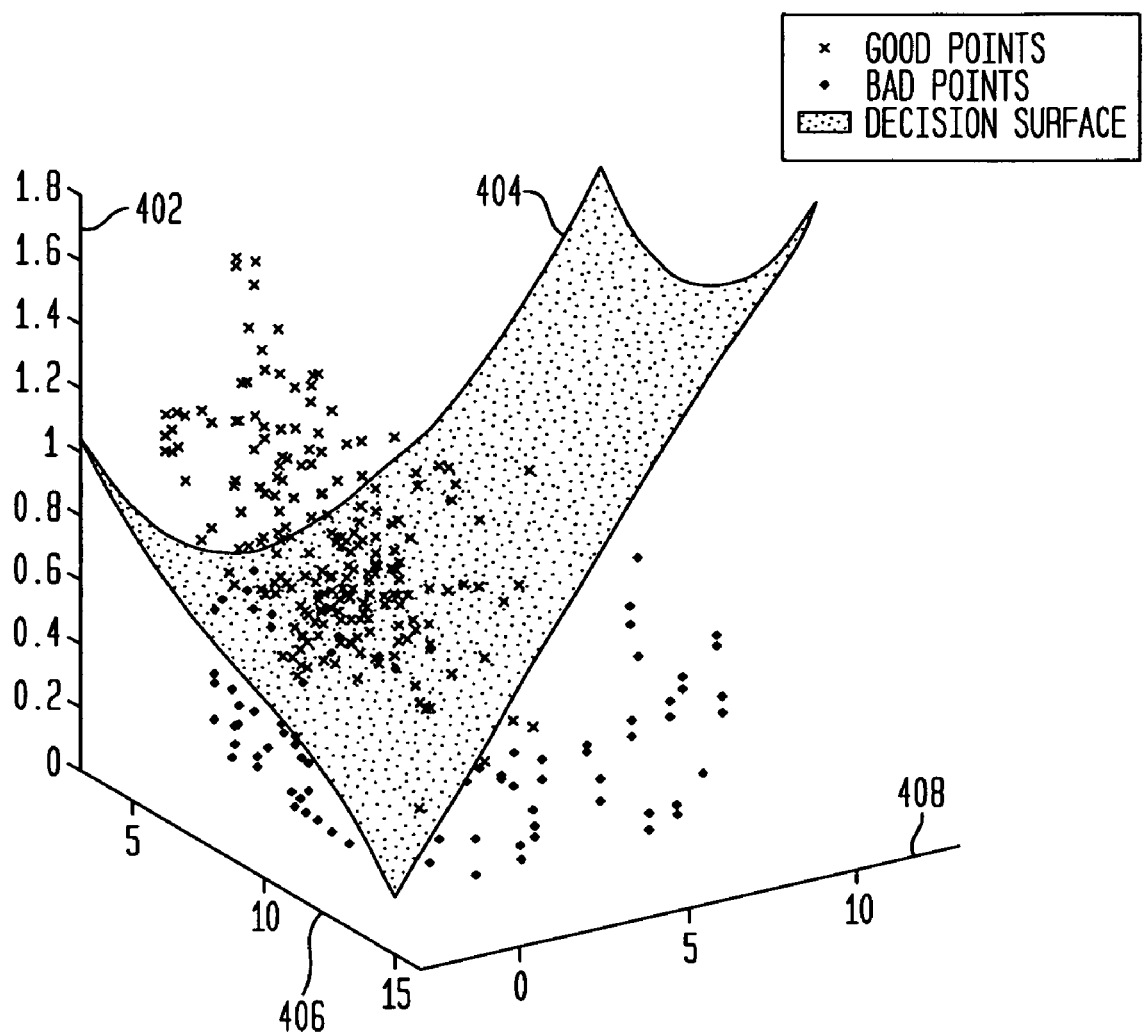
FIG. 4 is a graph illustrating a plotting of a decision surface based on measurements taken relating to three myocardial features.
Figure 5:
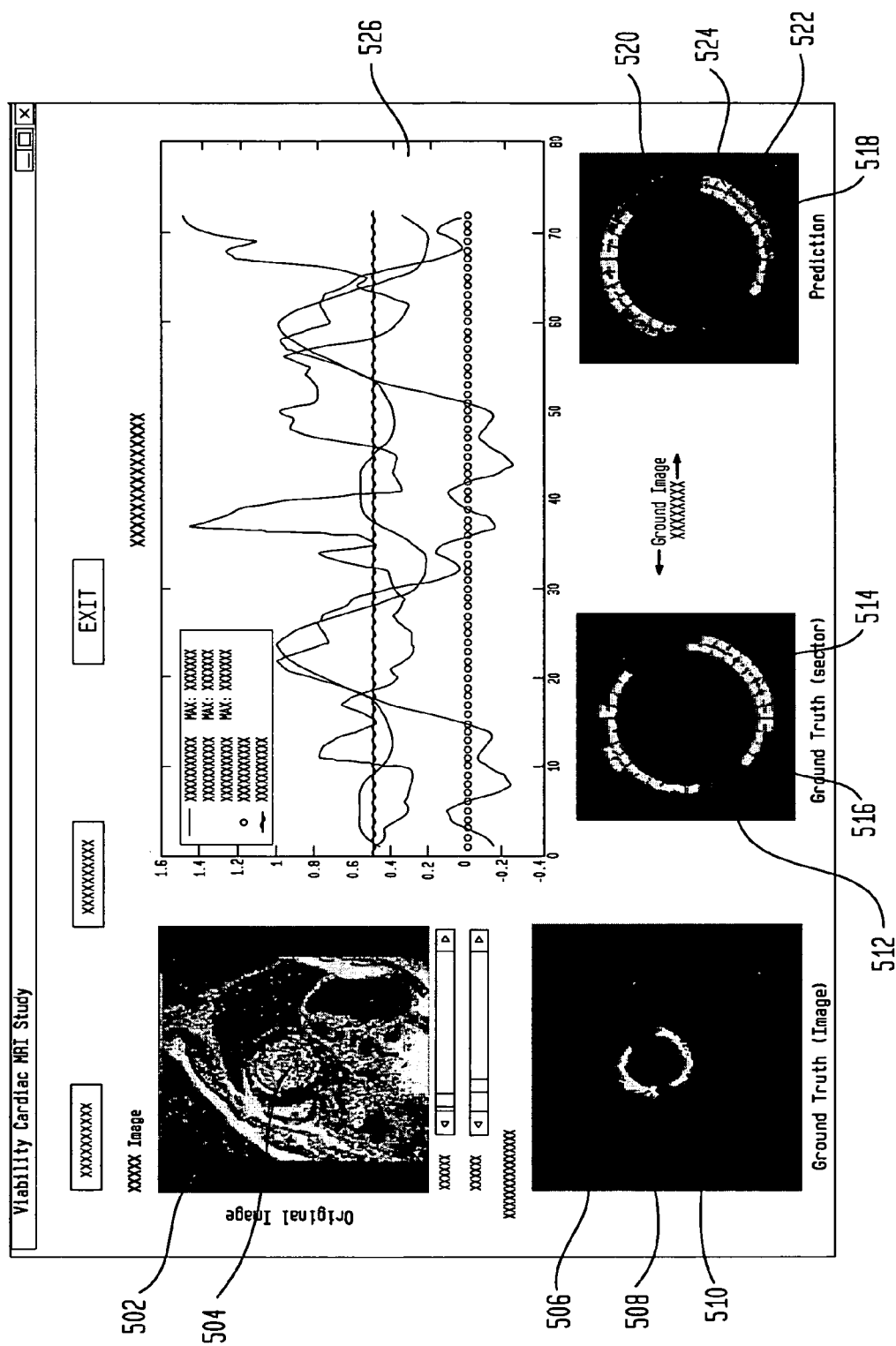
FIG. 5 is an illustration of an exemplary user interface that shows data from a DEMR screening.

Referring to FIGS. 3-5, the present invention will now be described with respect to an exemplary screening and set of data obtained using SVM and a number of identified features. In accordance with the example and with reference to FIG. 3, DEMR images and Cine MR (Flash or TrueFisp) images are taken of 14 patients at three short axis slice positions (i.e. perpendicular to the long axis of the ventricle) (step 302). Using the Argus software package from Siemens, an expert delineated the myocardial borders on all images. The software segments the endocardial and epicardial borders of the left ventricle (step 304). The Argus software package provides fully automated segmentation of high-contrast TrueFisp cine images. The myocardium was divided into 36 radial sectors and each sector further subdivided circumferentially resulting in a total of 72 sectors (step 306). Each sector was characterized as viable or non-viable by the expert.

A total of 38 DEMR images slices (3 slices per subject, four slices excluded due to being anomalous) were obtained with ground truth provided by the expert. The ground truth is the expert's medical diagnosis. Each experiment consisted of 38 sub-experiments where one slice acted as a "test" and all other slices as training set (leave-one-out strategy). The average accuracy rate of all 38 test sets was used to determine the parameters a and C needed for the SVM algorithm. Based on the experiments, we set a σ=0.1 and C=10 and achieved an average accuracy of 87%.

FIG. 4 illustrates a projection of a resulting six dimensional decision surface onto 3 dimensions 404 that was obtained from measurements determined from the 38 DEMR image slices. In accordance with the present invention, the features measured were wall thickness (x axis 406), thickening of the myocardial tissue (y axis 402) and DEMR intensity (z axis 408). The measured features are then used to create the decision surface. The decision surface 404 has a negative margin meaning that the sectors were not completely separable into viable and non-viable categories based on our features. Each x indicates a non-viable sector and each • indicates a viable sector. By measuring the identified myocardial features for a patient, the decision surface can be used to help determine if and where there is non-viable tissue.

FIG. 5 illustrates an exemplary user interface for displaying the myocardial data. Once the patient has been imaged and the features measured (step 308), the collected patient data is applied to the decision surface (step 310). Based on the outcome, a prediction is made as to whether each sector contains viable or non-viable tissue (step 312). The resulting data is then displayed using the interface (step 314).

Included on the display are data pertaining to the MRI scan. In the upper left hand corner of the display is a DEMR image 502 of the heart and in particular the patient's Left Ventricle (LV) 504. As can be seen, the walls of the artery 504 appear to not be homogeneous in intensity. In other words, some areas of the LV wall appear to be brighter than other sections of the wall.

Graph 526 plots brightness from DEMR, thickness and thickening over the sectors; the dotted lines show the ground truth (below) and predictions using the SVM (above). In the Prediction image 518, in the lower right corner of the interface, white sectors 524 indicate non-viable tissue, gray sectors 522 are sectors of uncertain viability, and black sectors 520 represent viable tissue. As discussed previously, these predictions are made using SVMs.

The ground truth images 506, 512, in the lower left corner indicate the doctor's medical diagnosis based on the DEMR. In the ground truth image 506, the high intensity areas 508, 510 indicate the non-viable tissue. In the ground truth sector image 512, the white sectors 514 indicate the non-viable tissue and the black sectors 516 indicate the viable tissue.

Having described embodiments for a method for segmenting myocardial tissue and determining if the tissue is non-viable using artificial intelligence techniques, it is noted that modifications and variations can be made by persons skilled in the art in light of the above teachings. It is therefore to be understood that changes may be made in the particular embodiments of the invention disclosed which are within the scope and spirit of the invention as defined by the appended claims. Having thus described the invention with the details and particularity required by the patent laws, what is claimed and desired protected by Letters Patent is set forth in the appended claims.

We claim:

1. A computer implemented method for imaging and identifying non-viable myocardial tissue in a patient's heart, the method performed by the computer comprising the steps of:
   obtaining images of a section of the myocardium;
   segmenting an endocardial border and epicardial border of the section of the myocardium;
   dividing the segment of the section of the myocardium into sectors;
   measuring one or more a plurality of selected features of the sectors of the myocardium;
   applying the measured plurality of one or more features to a decision function to create a decision surface, wherein the decision function that creates said decision surface is a function ƒ(x) that maps a multidimensional vector x formed of said selected feature measurements to a scalar real value indicative of whether a tissue sector is viable or non-viable;
   determining from said decision surface whether each sector contains viable or non-viable myocardial tissue; and
   displaying an image that shows each sector of the myocardium and an indication of its viability,
   wherein said steps of obtaining images, segmenting an endocardial border and epicardial border, dividing the section into sectors, measuring a plurality of selected features, determining whether each sector contains viable or non-viable myocardial tissue, and displaying an image are perfoimed by a computer processor.

2. The method of claim 1 wherein the images obtained are using Delayed Enhanced Magnetic Resonance (DEMR) imaging.

3. The method of claim 1 wherein the section of the myocardium is a left ventricle.

4. The method of claim 1 wherein said features are selected from a group comprising image intensity, thickness of the myocardium, differential thickness of the myocardium, homogeneity of the myocardium, transmurality of scar (non-viable) tissue, a position of the sector of tissue, a rate of contrast agent uptake, and material strain information from tagged-MR.

5. The method of claim 1 wherein said decision surface separates measurements identifying viable tissue sectors from non-viable tissue sectors.

6. The method of claim 1 wherein sectors of viable tissue are displayed as a first color and sectors of non-viable tissue are displayed as a second color.

7. A program storage device readable by a computer, tangibly embodying a program of instructions executable by the computer to perform the method steps for imaging and identifying non-viable myocardial tissue in a patient's heart, the method comprising the steps of:
   obtaining images of a section of the myocardium;
   segmenting the section of the patient's myocardium into an endocardial border and an epicardial border;
   dividing the a myocardial wall of the section of the myocardium into sectors;
   measuring one or more selected features of the sectors of the myocardial wall;
   applying the measured one or more features to a decision function to create a decision surface, wherein the decision function that f creates said decision surface is a function $f(x)$ that maps a multidimensional vector x founed of said selected feature measurements to a scalar real value indicative of whether a tissue sector is viable or non-viable;
   determining from said decision surface whether each sector contains viable or non-viable myocardial tissue; and
   displaying an image that shows each sector of the myocardial wall and an indication of its viability.

8. The computer readable program storage device of claim 7 wherein the section of the myocardium is a left ventricle.

9. The computer readable program storage device of claim 7 wherein said features are selected from a group comprising image intensity, thickness of the myocardium, differential thickness of the myocardium, homogeneity of the myocardium, transmurality of scar (non-viable) tissue, a position of the sector of tissue, a rate of contrast agent uptake, and material strain information from tagged-MR.

10. The computer readable program storage device of claim 7 wherein said decision surface separates measurements identifying viable tissue sectors from non-viable tissue sectors.

11. The computer readable program storage device of claim 7 wherein sectors of viable tissue are displayed as a first color and sectors of non-viable tissue are displayed as a second color.

12. The computer readable program storage device of claim 7 wherein the images are obtained using Delayed Enhanced Magnetic Resonance (DEMR) imaging.

\* \* \* \* \*